Patented July 27, 1937

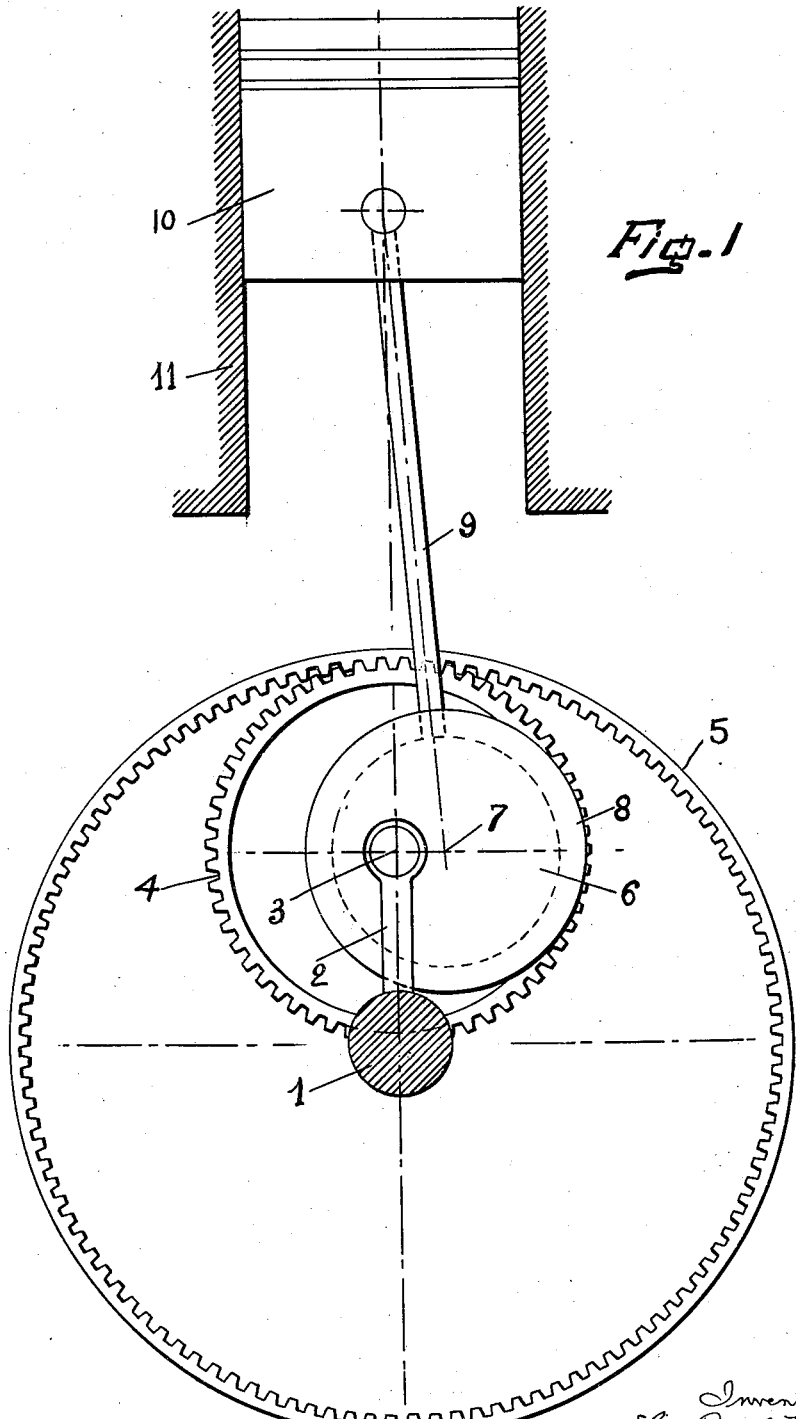

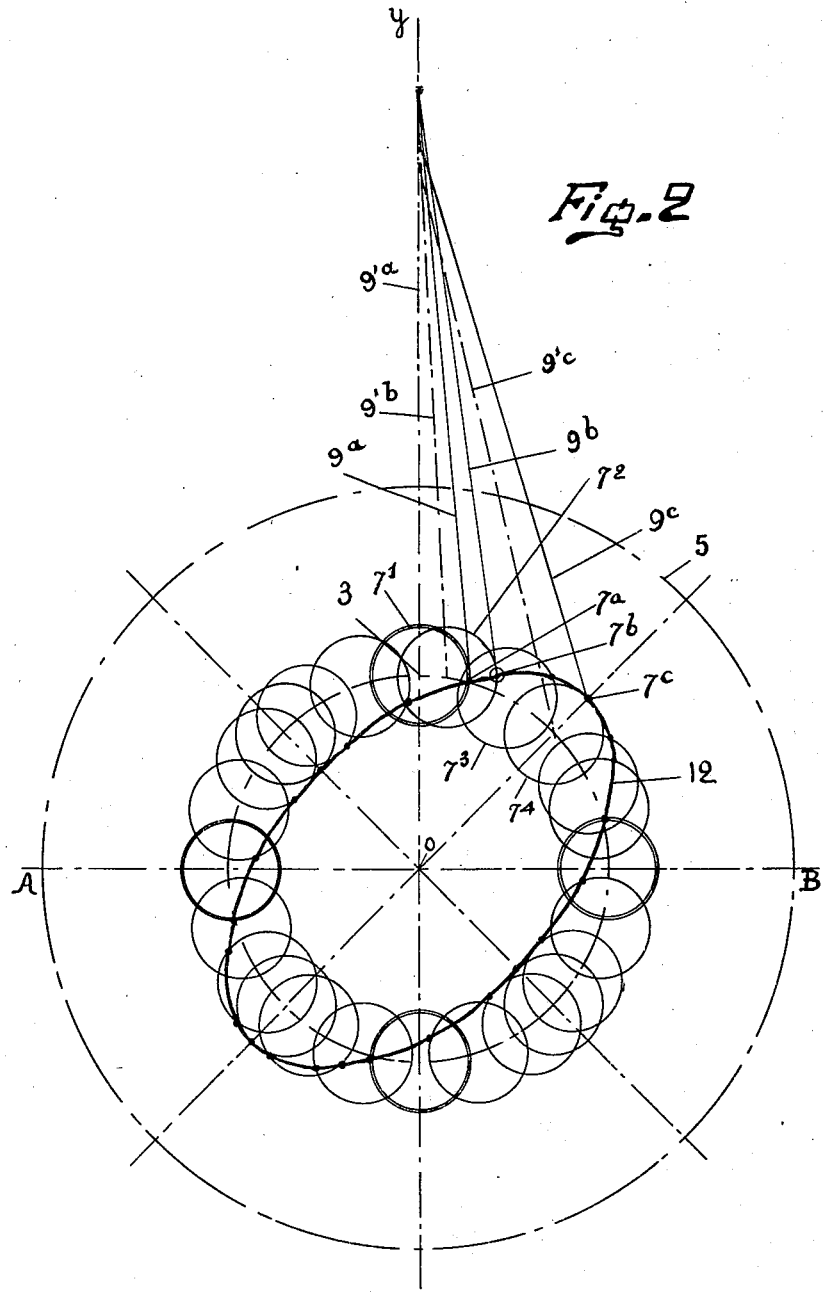

2,088,332

UNITED STATES PATENT OFFICE 2,088,332

MOVEMENT CONVERTING DEVICE

Elie Raoul Marchou, Neuilly-sur-Seine, France

Application August 8, 1935, Serial No. 35,267
In France March 20, 1935

8 Claims. (Cl. 74—52)

The present invention relates to a method of transforming a reciprocating rectilinear movement, for example, the displacement of a piston in a cylinder, into a circular movement, for example the rotation of a shaft on its axis, or conversely.

This method of transformation is characterized by the fact that on the crank pin of the rotating shaft, is rotatably mounted a mover having on its faces one, or a plurality of discs which are eccentric relatively to the crank pin and on which are directly coupled the connecting rods serving to transform the reciprocating rectilinear movement into a circular movement, or conversely, the rotation of said mover on the crank pin and, with it, of the eccentric disc or discs which are secured to same, being produced directly by the rotary movement of the crankshaft.

According to one characteristic of the invention, the mover carrying the eccentric discs is constituted by a toothed wheel meshing with a toothed crown wheel having either inner or outer teeth. Likewise according to the invention, said toothed crown wheel is either fixed on the frame of the machine or has a rotary movement on its axis.

Other advantages and peculiarities of the invention will become apparent from the description which will be made with reference to the accompanying drawings which represent diagrammatically and by way of example one embodiment of the invention.

In said drawings:

Fig. 1 shows the essential parts of a mechanism according to the invention.

Fig. 2 shows the different positions occupied successively by certain members of said mechanism during a cycle of operations.

The method of transformation of a reciprocating rectilinear movement into a circular movement, or conversely, established according to the invention has the following different members:

A shaft 1 rotating about its axis, carries a crank 2 on the crank pin 3 of which is rotatably mounted a toothed wheel 4 which constantly meshes with a toothed crown wheel 5 provided with internal teeth. The wheel 4 has a diameter half that of the crown wheel 5, so that it makes a complete revolution about its own axis while going once round the circumference of the crown wheel 5. On the toothed wheel 4, is eccentrically secured a disc 6, the centre of which is at 7. The connecting rod 9, fixed in the usual manner to the piston 10 which moves in the cylinder 11, is connected directly to the disc 6. The connecting rod 9 has been shown diagrammatically for this purpose in Figure 1, as terminating in a collar 8 which surrounds the disc 6.

The device operates in the following manner:

Assuming that the piston 10 is the piston of a motor, for example an internal combustion engine, of which it is required to transmit the reciprocating rectilinear movement to the shaft 1 and the piston being assumed to be at the top of its stroke and urged downwardly by the impelling gases, it pushes the connecting rod 9, the movement of which is transmitted to the disc 6, whereby a tendency is produced to rotate the crankshaft 2 in a clockwise direction. But, at the same time as the crankshaft 2 rotates, it carries with it the toothed wheel 4 rotatably mounted on the crank pin 3, and said toothed wheel 4 which rolls owing to this on the toothing of the crown wheel 5, is thus given a simultaneous movement of translation and rotation. Consequently, the disc 6 which is secured to said toothed wheel also rotates with it inside the collar 8; as, on the other hand, the centre 7 of the disc 6 is eccentric relatively to the crank pin 3 which is the centre of the wheel 4, said point 7, at the same time as it has a tendency to be pushed downwards (in the position of Figure 1) by the piston 10, describes a circumference about the crank pin 3. The movement thus obtained is shown diagrammatically in Figure 2.

In this figure, the circle 5 illustrates diagrammatically the crown wheel 5 on which, as has been stated, rolls the toothed wheel 4. The circles $7^1$, $7^2$, $7^3$ . . . represent the different loci which the point 7 would describe (centre of the eccentric disc 6) about the centre 3 of the crank pin and of the toothed wheel 4, if said eccentric disc 6, were free to rotate about said centre 3 in each of the positions successively occupied by the crankshaft 2. When the crankshaft is in its upper vertical position shown in Figure 1, the point 7 occupies a position $7a$ on the circle $7^1$. Said position $7a$ depends, moreover, on the manner in which the toothed wheel 4 has been fixed relatively to the toothed crown wheel 5, taking into account the position of the crank, and it will be conceived that by rotating said toothed wheel 4 about its centre before engaging it with the wheel 5 (for example by making it slide on its shaft so as to make it come out the plane of the wheel 5), the point $7a$ could be made to occupy any desired position on the circle $7^1$ for a given position of the point 3. Assuming, however, that the fixing has been carried out as illustrated in the position of Figure 1, and that the crankshaft rotates in a clockwise direction, as stated, the toothed wheel 4 is carried round by this movement since it is mounted on the pin 3, in fact, it effects a movement of translation, but at the same time it rotates on said pin 3 while rolling on the crown wheel 5, and carries with it the disc 6. The point 7 of said disc, at the same time as it rotates about the axis O of the shaft 1 therefore describes a second rotary movement about the point 3 and the locus described by the point 7 is, as could be shown or illustrated graphically, an ellipse 12. This enables it to be determined what are, in the course of the rotation of the shaft 1, the various positions occupied by the connecting rod 9, and with it the piston 10. In Figure 2, there has been shown in thin lines, the various positions occupied by the connecting rod.

It will thus be seen that in the first portion of the rotation of the crankshaft starting from the position of Figure 1, the point 7 (theoretical crank head) instead of moving downwards, remains substantially at a constant height above the horizontal axis A—B (in fact it describes an arc of an ellipse 7a–7c). In fact, with the fixing shown in Figure 2, the point 7 continues to rise, even after the crank pin 3 has passed beyond the axis Oy, up to the point where the tangent to the ellipse is horizontal; the same applies to the piston (save for the rectification due to the greater obliqueness of the connecting rod relatively to the axis Oy). It will therefore be seen that the connecting rod is already rather steeply inclined relatively to the axis Oy when the piston is at its upper dead centre, the head of the crank being then nearly at 7b. While the point 7 passes from 7a to 7c, the connecting rod 9 successively occupies corresponding positions 9a, 9b, 9c. There has also been shown in Figure 2, in dot and dash lines, the positions which would be occupied at the same instant, i. e. for the same positions of the crankshaft, by a connecting rod of a transmission system of the usual type; the head of said connecting rod would be successively in the centre of each of the corresponding circles 7 and is designated in each of the cases by a similar reference provided with an index "'", the part 9'c for example being the connecting rod of an ordinary transmission for the position of a crankshaft at 45°, the connecting rod of the mechanism according to the invention being at that instant in the position 9c.

It will be seen by comparing the positions of the connecting rods 9a, 9b, 9c, with those of the connecting rods 9'a, 9'b, 9'c of an ordinary machine, that in the whole of this portion of the rotation of the crankshaft, the piston represented by the upper end of each of the connecting rods in question, on the vertical axis Oy, moves much less rapidly than in the case of an ordinary machine. If, for example, the mechanism according to the invention is applied to the transmission of a movement of an internal combustion engine, it will be seen that at the beginning of the motive stroke of the piston, i. e., in fact the part of said stroke which is the most effective since the gases are then most highly compressed, a rotation of the crank shaft through 45° is obtained almost without displacement of the piston. Consequently, the force of expansion of the gases which remain longer compressed, is much better utilized. Furthermore, during the whole of this first part of the stroke, the distance which separates the crank head from the axis Oy, i. e., the lever arm of the torque, is much greater than in the case of an ordinary motor, at the time when the force exerted by the impelling gases is greatest.

As explained above, the setting of the toothed wheel 4 can be modified with respect to the crown wheel 5, the modification of this setting resulting, in the diagram of Fig. 2, in a variation of the slope of the axes of the ellipse respectively to the axes Oy, A—B, that is to say in a modification of the point of connection of the crankshaft. This modification may be of interest in certain cases. It enables the respective positions of the crank and of the connecting rod to be best adjusted according to the speeds of rotation, the amount of compression, etc., in the same manner as for advancing the spark in internal combustion engines. In a general manner the assembly constituted by the toothed wheel 4 and the eccentric disc 6 which is secured thereto may be called "eccentric mover" and the use of said eccentric mover is in general applicable to all crankshafts, connecting rods or equivalent members which have to transmit or receive any force for transforming the circular movements of crankshafts into rectilinear movements of the connecting rods, or conversely. The use of the eccentric mover as a transmission member is applicable in particular to steam engines, internal combustion engines of any kind, gasoline motors, Diesel engines, gas engines and the like, to air, gas, liquid, vacuum, compressors and pumps of any kind, and the like.

In the application of the principal of the invention to steam engines, the duration of the expansion of the steam on the piston can, in particular, be increased without any mechanical transformation, by modifying the amplitude and the speed of the stroke through which the piston travels, without modifying those of the crankshaft. The phases of the distribution and of the expansion by the slide valves can also be better harmonized.

In the application of the principle of the invention to internal combustion engines, one can:

(a) Amplify the down-stroke through which the piston travels during the gas inlet stroke and thus increase the volumetric capacity of the suction.

(b) Eliminate the dead centre periods of the crankshaft (as explained above), as said dead centre periods no longer coincide, owing to the movements of the eccentric mover, with the upper and lower dead centres of the piston.

(c) Reduce to the minimum the stress exerted during the compression by the thrust of the gases on the cranks, such reduction of stresses being obtained by the shortening of the crank arm owing to the displacement of the eccentric mover.

(d) Eliminate the premature expansion of the gases which is exerted on the piston generally in the opposite direction to the normal rotation of the crankshaft owing to the advance of the spark. Such premature expansion of the gases is avoided by the angular position taken up by the eccentric mover during its displacement, thereby permitting the crank to have passed over its upper dead centre position before the piston has attained the upper dead centre of its up-stroke.

(e) Prolong the duration of combustion of the gases and increase and prolong the expansion force of the latter which, owing to the almost negative speed of the piston at the beginning of its up-stroke, cannot expand too rapidly and thus exert a thrust which is all the more powerful on the face of the piston, as explained above. The force of expansion of the gases is increased during this working phase by the increase in length of the crank arm.

(f) Prolong the phase of the power stroke, owing to the increase of the down stroke of the piston which attains its lower dead centre after the crank arm has passed over its own dead centre.

(g) Reduce the tangential stresses on the connecting rods and the piston.

(h) Eliminate the stoppages or sudden stallings due to losses of speed under load.

(i) Balance the centrifugal forces of the crankshaft by the centripetal forces of the eccentric mover.

These factors of increased power, security, harmony and control are solely obtained by means of the different angular positions successively taken up by the eccentric mover which is the object of the present invention during its various movements of translation and of rotation and without any mechanical transformation.

In the application of the principle of the invention to compressors or pumps, all the advantages set forth above are obtained, in particular, the increase in the volumetric capacity of the suction, the increase in the amount of compression without additional expenditure of force, the reduction of the stress exerted on the crank arm at the time when the compression is most intense, whereby economy of power expended and diminution of the volume of the apparatus, is obtained.

In the foregoing description, made with reference to the drawings, it has been assumed that the mover 4 only has a single eccentric disc 6 and that the toothed crank wheel 5 is fixed and is toothed internally. It is understood that this is only a particular embodiment, that the mover could have on its faces one or a plurality of eccentric discs, and that the crown wheel could be toothed externally and could be moving and itself have an appropriate rotary movement. It could even be assumed that said wheel is replaced by any other coupling system having wheels or gears which would transmit to the eccentric mover a rotary movement without modifying in any way the principle of the present invention.

In general, it is understood that the invention has only been illustrated in the accompanying drawings and hereinbefore described in an explanatory and in no way limitative manner and that it could have any modification or variation of detail within the scope of the appended claims.

I claim:

1. Device for converting a rectilinear reciprocating movement into a circular movement or conversely, comprising in combination, a reciprocating element, a rotatable shaft having a crank and a crank pin, a rod pivotally connected at one of its ends to said reciprocating element, a circular element rotatably mounted at its centre on said crank pin, a disc secured to said circular element, said disk having its center offset from a plane containing the axes of the rotatable shaft and the crank pin and on which the other end of said rod is fulcrumed, and means cooperating with said circular element whereby the rotation of said crank causes said circular element to rotate about said crank pin.

2. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and a crown wheel meshing with said toothed wheel, whereby the rotation of said crank causes said toothed wheel to rotate about said crank pin.

3. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and a crown wheel meshing with said toothed wheel and held against rotation about its axis, whereby the rotation of said crank causes said toothed wheel to rotate about said crank pin.

4. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and a crown wheel meshing with said toothed wheel and mounted for rotation on its axis.

5. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and an internally toothed crown wheel meshing with said toothed wheel whereby the rotation of said crank causes said toothed wheel to rotate about said crank pin.

6. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and means for causing said toothed wheel to make one revolution about said crank pin for each revolution of said shaft.

7. Device for converting a rectilinear reciprocating movement into a circular movement or conversely, comprising in combination, a reciprocating element, a rotatable shaft having a crank and a crank pin, a rod pivotally connected at one of its ends to said reciprocating element, a toothed wheel rotatably mounted at its centre on said crank pin, a disc secured to said toothed wheel, said disk having its center offset from a plane containing the axes of the rotatable shaft and the crank pin and on which the other end of said rod is fulcrumed, and a gear wheel meshing with said toothed wheel and so geared to said shaft that the rotation of said crank causes said toothed wheel to make one revolution about said crank pin for each revolution of said shaft.

8. In a transmission between a rectilinear reciprocating member and a rotatable member, a circular member adapted to rotate both about its own axis and that of said rotatable member, to which it is operatively connected, and a disc secured to said circular element, said disk having its center offset from a plane containing the axes of the circular member and the rotatable member, and a rod pivotally connected at one end to the reciprocating member and at its other end to said disk.

ELIE RAOUL MARCHOU.